(12) United States Patent
Eom et al.

(10) Patent No.: US 7,520,682 B2
(45) Date of Patent: Apr. 21, 2009

(54) TRANSCEIVER MODULE AND OPTICAL BENCH FOR PASSIVE ALIGNMENT

(75) Inventors: Yong-Sung Eom, Daejeon (KR); Jong-Tae Moon, Daejeon (KR); Ho-Gyeong Yun, Seoul (KR); Byung-Seok Choi, Daejeon (KR); Jong-Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 16 days.

(21) Appl. No.: 11/226,664

(22) Filed: Sep. 13, 2005

(65) Prior Publication Data

US 2006/0056775 A1 Mar. 16, 2006

(30) Foreign Application Priority Data

Sep. 14, 2004 (KR) ............ 10-2004-0073359

(51) Int. Cl.
*G02B 6/36* (2006.01)
*H04B 10/12* (2006.01)
(52) U.S. Cl. .................. 385/89; 385/92; 398/141
(58) Field of Classification Search .......... 385/89
See application file for complete search history.

(56) References Cited

U.S. PATENT DOCUMENTS

| | | | | | |
|---|---|---|---|---|---|
| 5,499,312 | A | * | 3/1996 | Hahn et al. ............ | 385/91 |
| 5,515,392 | A | * | 5/1996 | Teremy ............. | 372/29.011 |
| 5,974,214 | A | * | 10/1999 | Shacklette et al. ........ | 385/50 |
| 6,106,160 | A | | 8/2000 | Kikuchi et al. | |
| 6,144,025 | A | * | 11/2000 | Tei et al. ............. | 250/226 |
| 6,195,495 | B1 | * | 2/2001 | Ota et al. ............. | 385/137 |
| 6,215,945 | B1 | * | 4/2001 | Fukuyama et al. ........ | 385/137 |
| 6,470,118 | B1 | * | 10/2002 | Uno .................. | 385/49 |
| 6,764,227 | B2 | * | 7/2004 | Snyder .............. | 385/88 |
| 6,862,378 | B2 | * | 3/2005 | Karnacewicz et al. ...... | 385/14 |
| 6,907,151 | B2 | * | 6/2005 | Yunus ............... | 385/14 |
| 6,959,125 | B2 | * | 10/2005 | Kanda et al. .......... | 385/14 |
| 2003/0082326 | A1 | * | 5/2003 | Yang et al. ........... | 428/40.1 |
| 2004/0161206 | A1 | * | 8/2004 | Harker .............. | 385/88 |
| 2005/0069257 | A1 | * | 3/2005 | Bhagavatula et al. ...... | 385/33 |
| 2005/0074213 | A1 | * | 4/2005 | Lin et al. ............ | 385/88 |

FOREIGN PATENT DOCUMENTS

KR 10-2004-0057710 7/2004

OTHER PUBLICATIONS

"Low-cost optical transceivers for access networks", J. Yoshida, NTT Opto-Electronics, OFC 1997 Technical Digest, pp. 275-276.

* cited by examiner

*Primary Examiner*—Uyen Chau N Le
*Assistant Examiner*—Kajli Prince
(74) *Attorney, Agent, or Firm*—Blakely, Sokoloff, Taylor & Zafman LLP

(57) ABSTRACT

The present invention provides a transceiver module having advantages of minimizing the number of optical parts by using an optical collimator to which a lens having the same shape as a diameter of an optical fiber is attached on a light input/output end. An transceiver module according to the present invention includes, laser diode for generating an optical signal to transmit, a first photodiode for controlling the laser diode, a second and third photodiodes for receiving an optical signal of a first and second wavelengths, and an optical collimator formed at a light input/output end. On the optical collimator, a lens having an optical fiber shape is attached in a direction the light proceeds.

21 Claims, 7 Drawing Sheets

[FIG. 1]
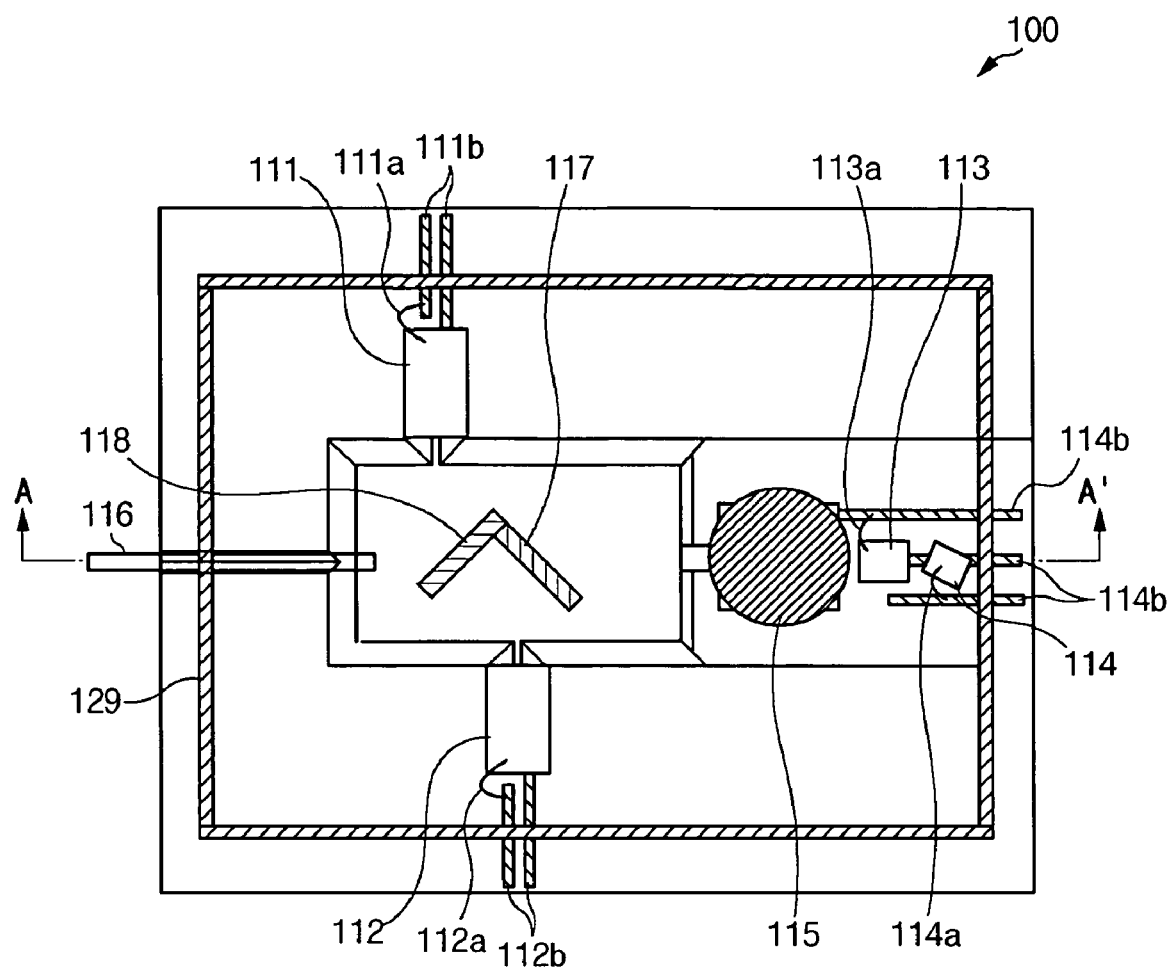

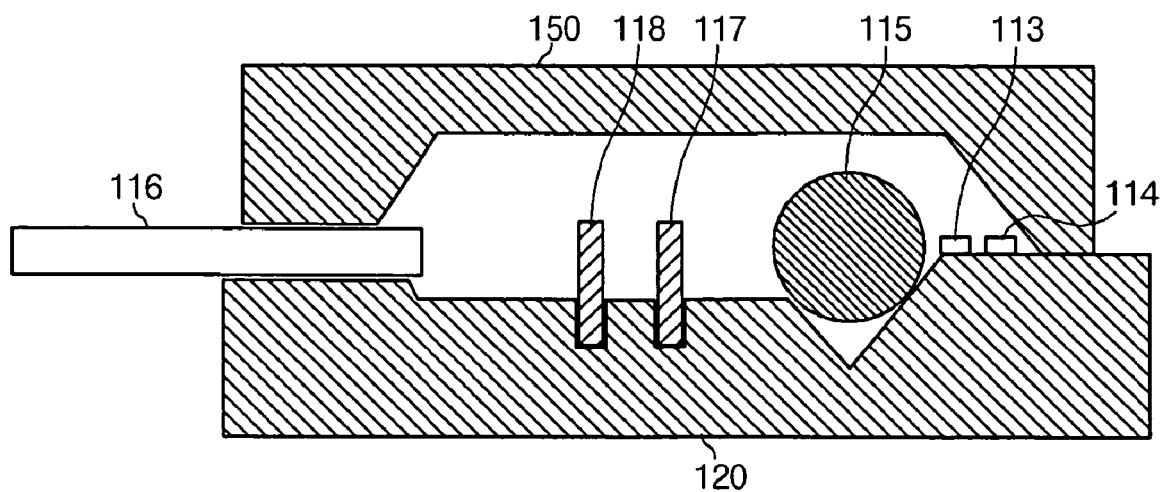
[FIG. 2]

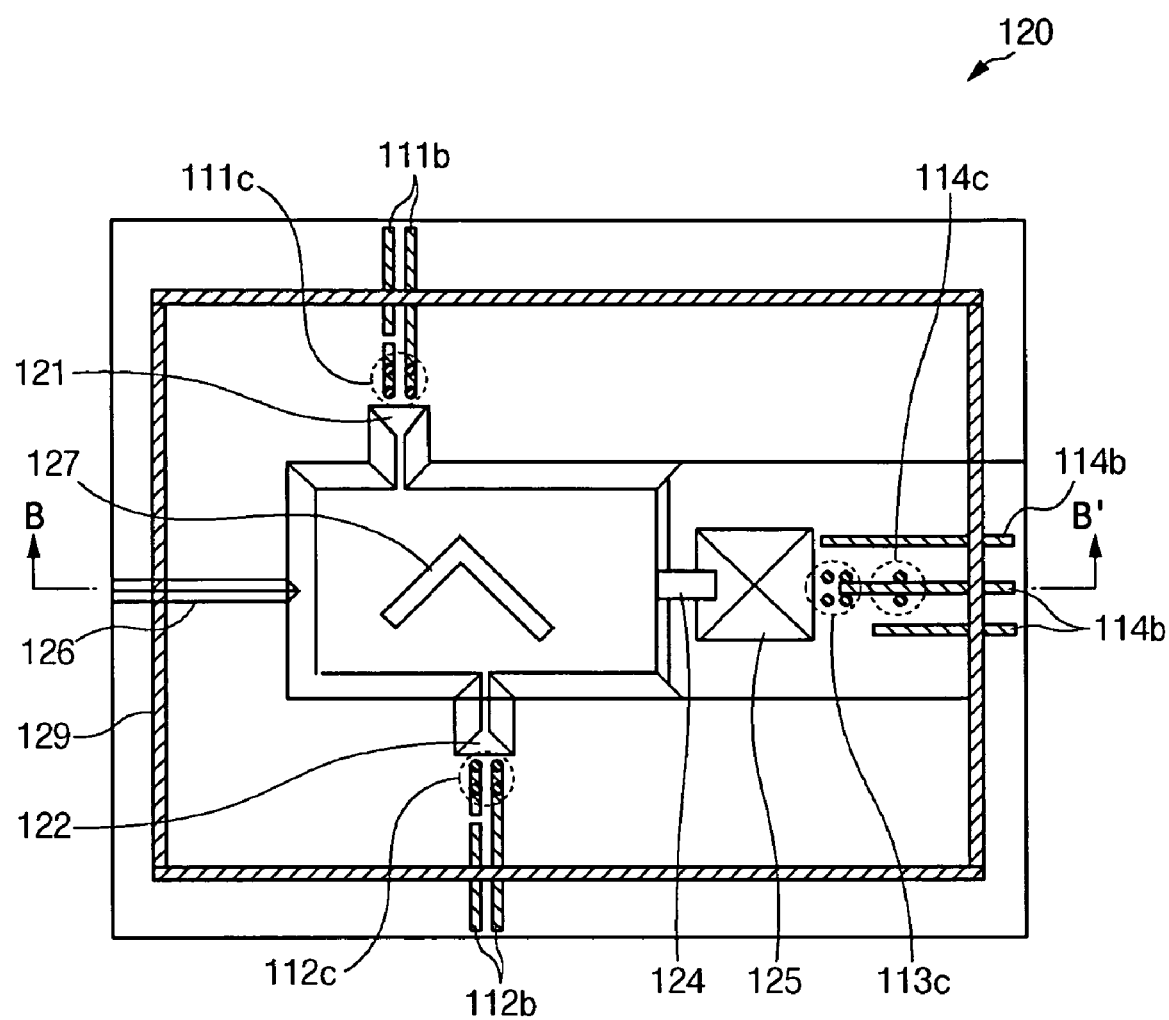
[FIG. 3]

[FIG. 4]
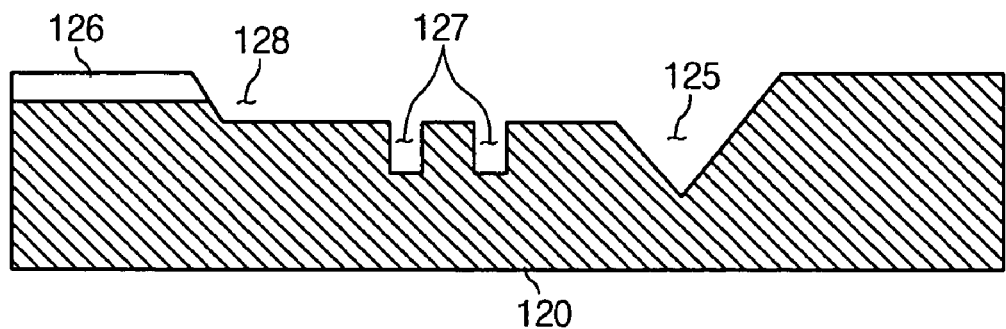
[FIG. 5]
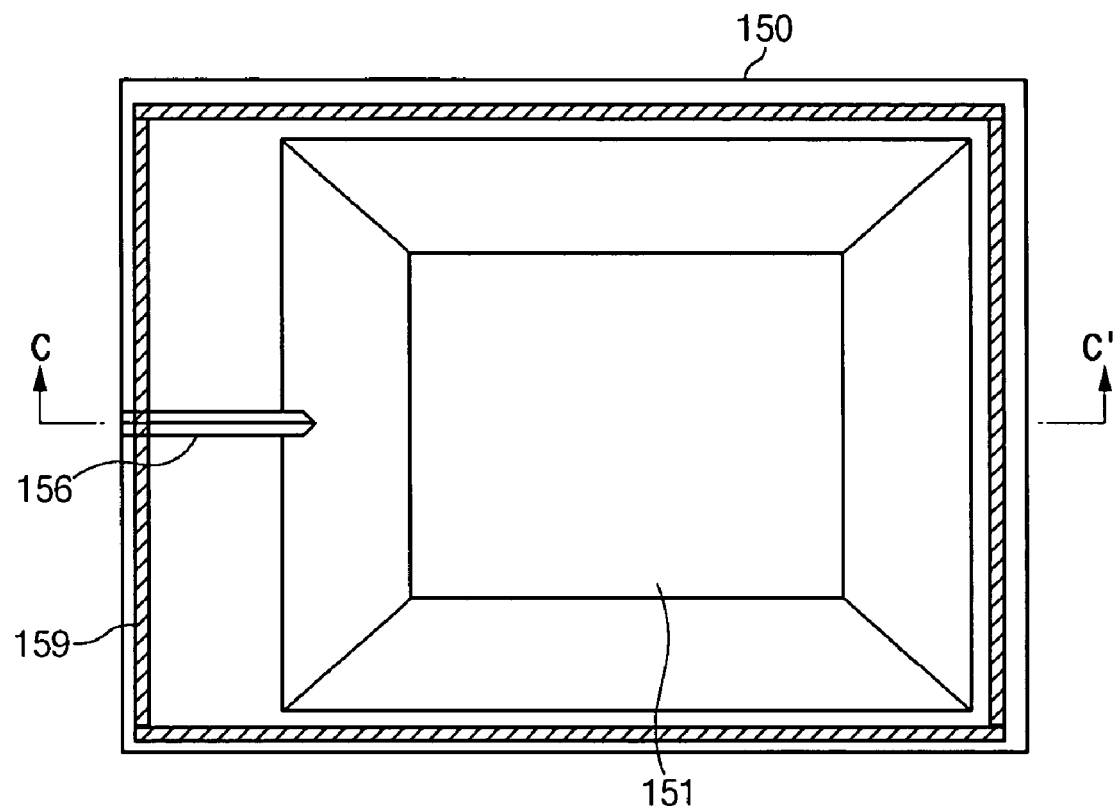

[FIG. 6]
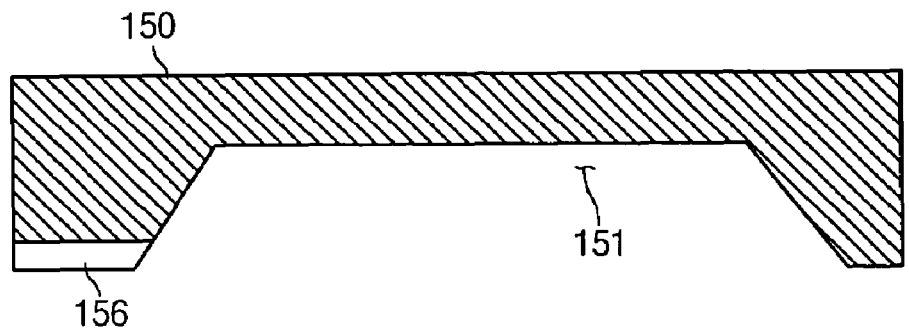
[FIG. 7]
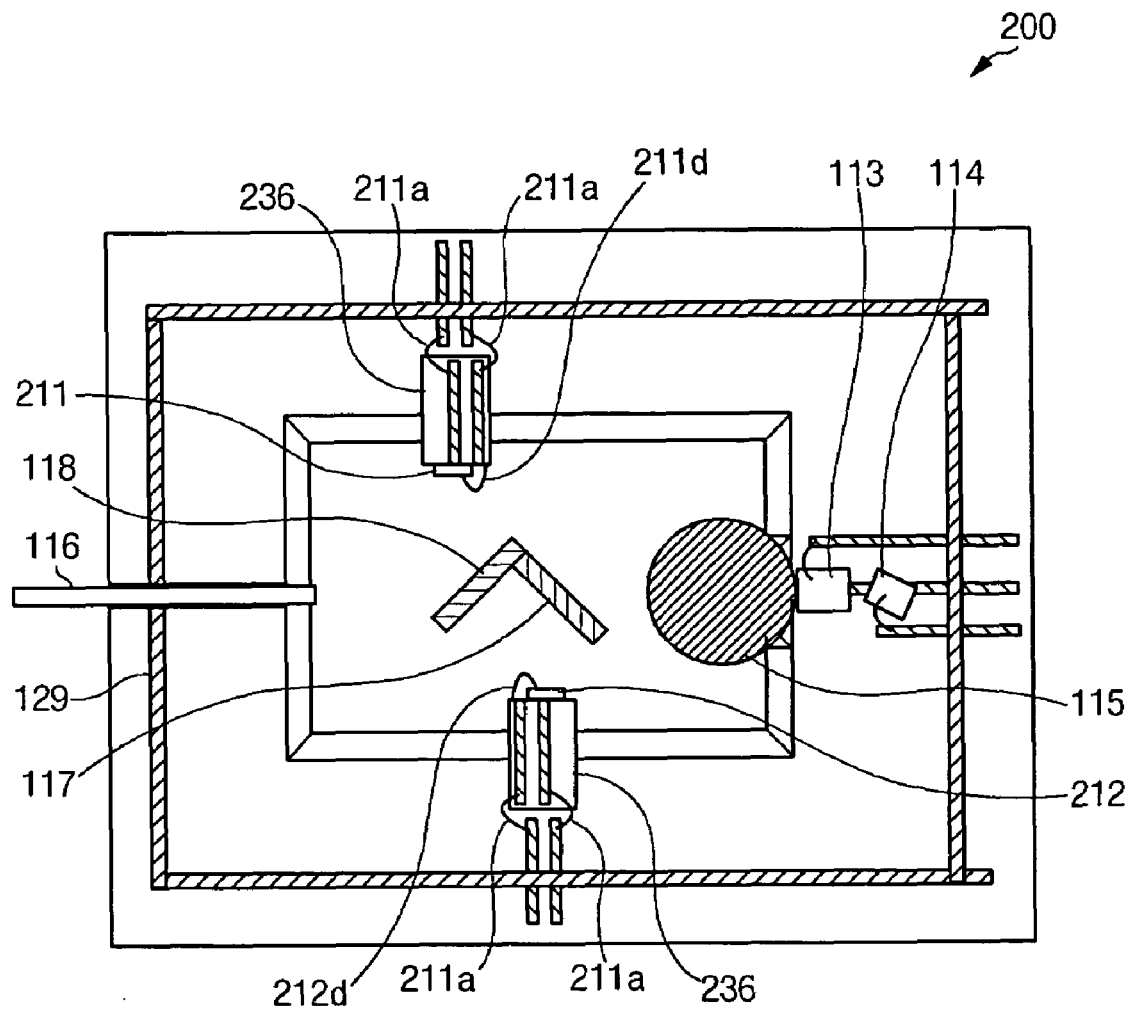

[FIG. 8]
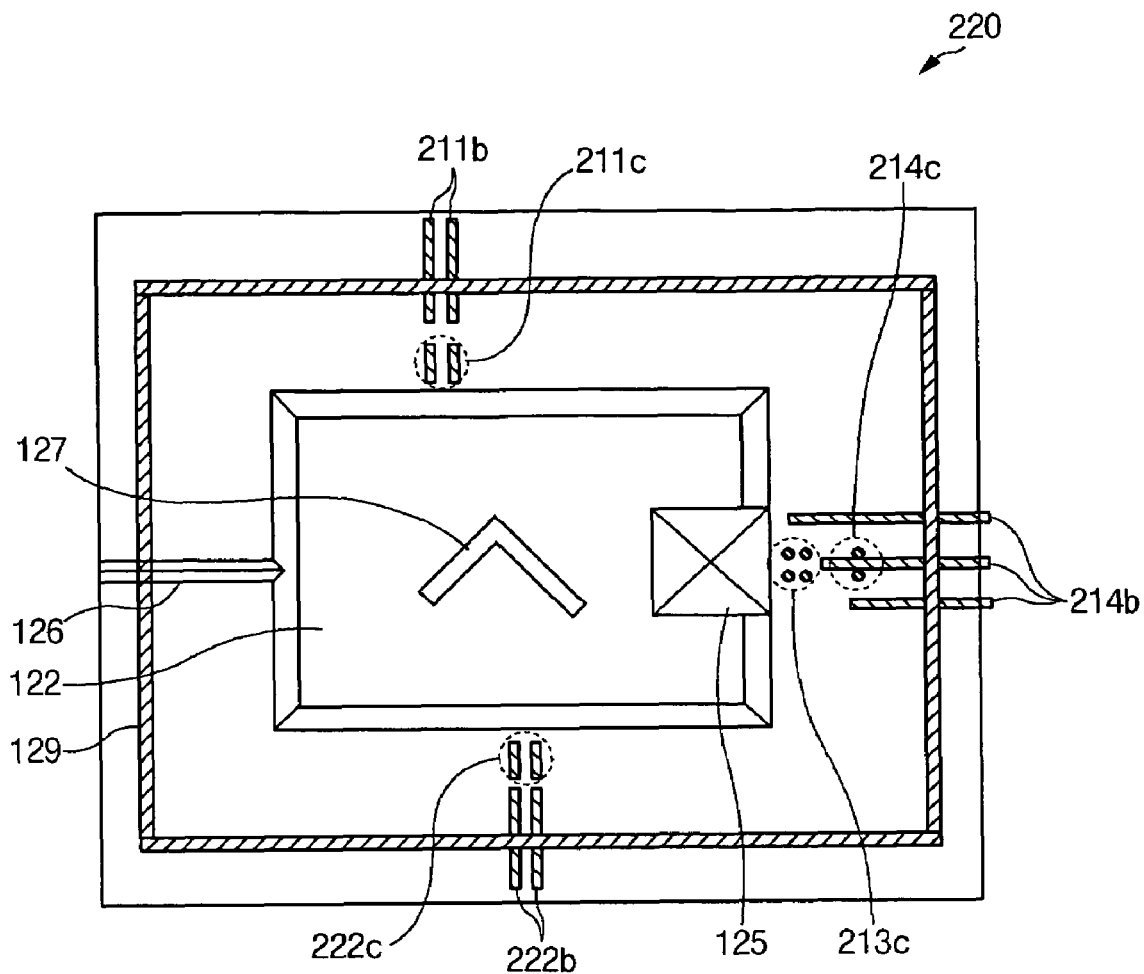
[FIG. 9]
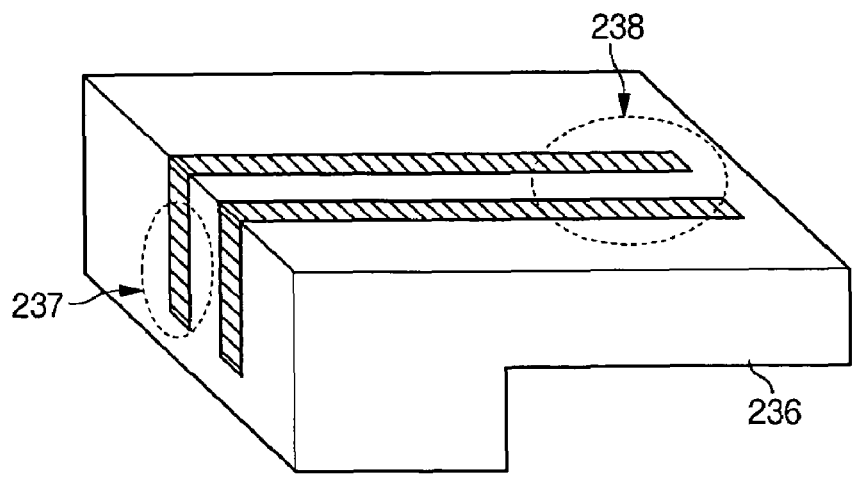

[FIG. 10]
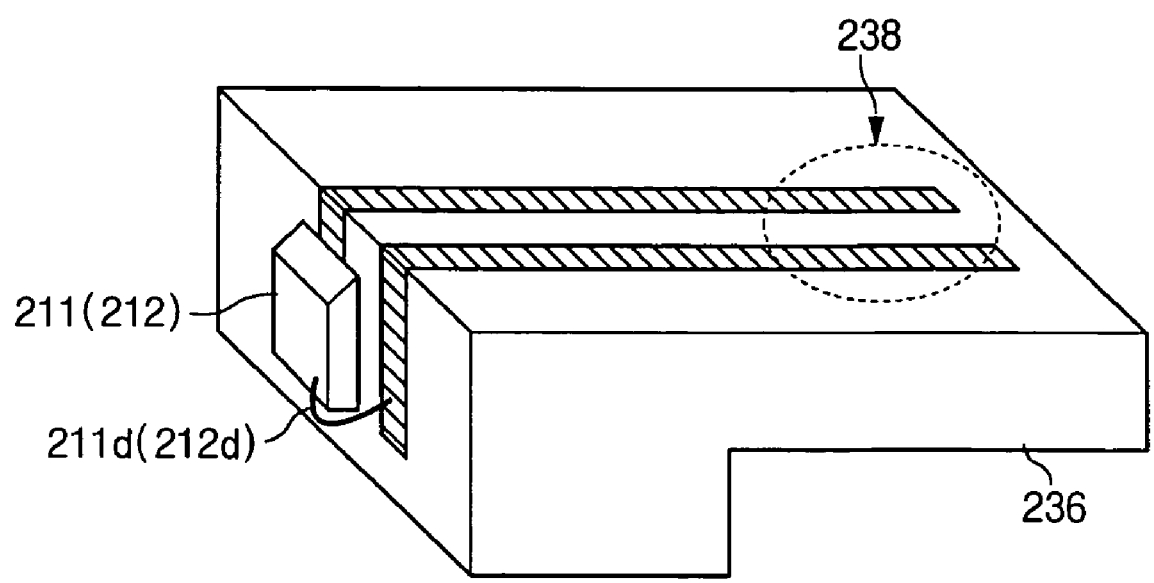

TRANSCEIVER MODULE AND OPTICAL BENCH FOR PASSIVE ALIGNMENT

CROSS-REFERENCE TO RELATED APPLICATION

This application claims priority to and the benefit of Korean Patent Application 10-2004-0073359 filed in the Korean Intellectual Property Office on Sep. 14, 2004, the entire content of which is incorporated herein by reference.

BACKGROUND OF THE INVENTION (a) Field of the Invention

The present invention relates to a transceiver module. More particularly, the present invention relates to a transceiver module packaged in a passive alignment scheme using an optical bench, and the optical bench used in the transceiver module.

(b) Description of the Related Art

Recently, exchange of information (e.g., image, data, voice) has become massive, and Internet communication has been widespread. Accordingly, super high speed information communication networks using optical fiber are rapidly being developed for high speed information transmission within and between countries.

To construct an optical communication network, optical fiber which is an medium for an optical signal, an optical transceiver module which converts an optical signal into an electrical signal or converts an electrical signal into an optical signal, and other functional elements for distributing, amplifying, and modulating a signal are essentially needed. Among these elements, the optical transceiver module is very important in constructing the optical communication system.

In this optical transceiver module, elements like a laser diode, a photodiode, and an optical fiber are aligned with micron precision. There are two types of alignment schemes for aligning the laser diode, the photodiode, and the optical fiber: an active alignment scheme and a passive alignment scheme.

The active alignment scheme is for fixing the laser diode at a certain position at which an amount of light incident to the optical fiber is maximized, by welding or using an epoxy adhesive while driving the laser diode. The passive alignment scheme is for fixing the laser diode without driving it. As examples for the passive alignment scheme, there are a scheme for aligning by recognizing positions of the laser diode and the optical fiber with an image processing device, a flip-chip bonding scheme using a phenomenon of minimization of surface tension of melted metal, and a scheme for minutely processing a silicon bench in a three-dimensional shape and mounting various optical elements having different functions on the silicon bench by using semi-conductor substrate photolithography.

This optical transceiver module has technical problems in aligning the optical fiber and the laser diode with micron precision, and needs a large amount of investment for installations necessary for mass production. Accordingly, the optical transceiver module is expensive and has drawbacks in that it costs a great deal to put the optical communication network in place.

Therefore, a transceiver module that is easy to manufacture and is able to be mass produced at a low cost by reducing the number of optical parts is urgently needed.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a transceiver module having advantages of minimizing the number of optical parts by using an optical collimator to which a lens having the same shape as a diameter of an optical fiber is attached on a light input/output end.

An exemplary transceiver module according to an embodiment of the present invention includes a laser diode, a first photodiode, a second photodiode, and an optical collimator.

Here, the laser diode generates an optical signal to transmit. The first photodiode controls the laser diode. The second photodiode receives an optical signal of a first wavelength among input optical signals. On the optical collimator formed at a light input/output end, a lens having an optical fiber shape is attached in a direction the light proceeds.

In another embodiment, the transceiver module further includes a third photodiode, a first filter, and a second filter.

Here, the third photodiode receives an optical signal of a second wavelength different from the first wavelength among the input optical signals. The first filter transmits an optical signal of a first wavelength band to which the first wavelength belongs, to the second photodiode. The second filter transmits an optical signal of a second wavelength band to which the second wavelength belongs to the third photodiode.

In a further embodiment, the first wavelength band has a range of 1540 to 1560 nm, and the second wavelength band has a range of 1480 to 1500 nm. In a still further embodiment, the first wavelength band has a range of 1300 to 1500 nm, and the second wavelength band has a range of 1300 to 1320 nm.

In a still further embodiment, the first filter and the second filter are respectively arranged to form a 45 degree angle with a light axis.

Another exemplary transceiver module according to the present invention includes a laser diode, a first photodiode, a ball lens, a second photodiode, a third photodiode, a first filter, a second filter, a first bench, and a second bench.

Here, the laser diode generates an optical signal to transmit. The first photodiode controls the laser diode. The ball lens converts an optical signal generated by the laser diode into a parallel optical signal. The second photodiode receives an optical signal of a first wavelength among input optical signals. The third photodiode receives an optical signal of a second wavelength different from the first wavelength among the input optical signals. The first filter transmits an optical signal of a first wavelength band to which the first wavelength belongs to the second photodiode. The second filter transmits an optical signal of a second wavelength band to which the second wave length belongs to the third photodiode. The optical element is provided at a light input/output end. On the first bench, the laser diode, the first to third photodiodes, and the first and second filters are aligned and fixed. The second bench provides a space for protecting the laser diode, the first to third photodiodes, and the first and second filters.

Here, the second bench is sealed with the first bench. In another embodiment, the laser diode and the first to third photodiodes are passively aligned on the first bench by a flip-chip bonding scheme.

In a further embodiment, the first bench includes a first slope, a second slope, a first space, a second space, a third space, and a first groove. The first slope allows the optical signal of the first wavelength band to be provided to the second photodiode. The second slope allows the optical signal of the second wavelength band to be provided to the third photodiode. The ball lens is aligned in the first space. The second space is a light path. The third space is provided in the second space, and the first and second filters are aligned in the third space. The optical element is aligned in the first groove.

In a still further embodiment, the first bench further includes a fourth space for allowing light having passed through the ball lens to proceed smoothly.

In a still further embodiment, a polymer or solder line for sealing is formed at corresponding edges of the first bench and the second bench.

In a still further embodiment, the first and second benches are silicon benches formed by using a silicon substrate.

In a still further embodiment, the first and second benches are optical benches produced by an injection or stamping scheme using a metal mold.

In a still further embodiment, the optical element provided at the light input/output end is a cylindrical optical collimator having substantially the same diameter as that of an optical fiber.

In a still further embodiment, the second and third photodiodes are respectively fixed on a sub-mount, and the sub-mount is passively aligned on the first bench.

In a still further embodiment, the sub-mount includes a pad and a metal wire. The pad respectively fixes the second and third photodiodes. The metal wire is respectively coupled with electrodes of the fixed second and third photodiodes.

An exemplary optical bench used in production of a transceiver module according to the present invention includes a first space, a first slope, a second slope, a second space, a third space, and a first groove. In the first space, a ball lens for converting an optical signal to be transmitted into a parallel optical signal is aligned. The first slope allows an optical signal of a first wavelength band in received optical signals to be provided to a first photodiode. The second slope allows an optical signal of a second wavelength band in the received optical signals to be provided to a second photodiode. The second space is to be a light path. In the third space, filters that filter the optical signals of the first and second wavelength band are aligned.

Here, the third space is provided in the second space. An optical collimator for light input/output is to be aligned in the first groove.

In another embodiment, the optical bench is a silicon bench formed on a silicon substrate by using an etching process.

In a further embodiment, the optical bench is produced by an injection or stamping scheme using a metal mold. In a still further embodiment, the third space is formed to allow the filters to stand up in a vertical direction.

In a still further embodiment, the first groove is formed in a V shape.

In a still further embodiment, the first space is formed in a pyramid shape.

BRIEF DESCRIPTION OF THE DRAWINGS

FIG. 1 is a top plan view showing a structure of a transceiver module 100 according to a first exemplary embodiment of the present invention.

FIG. 2 is a sectional view along line A-A' of FIG. 1 showing a side of the transceiver module 100 according to the first exemplary embodiment of the present invention.

FIG. 3 is a top plan view showing a shape of a lower silicon bench 120 before each element is fixed in the transceiver module according to the first exemplary embodiment of the present invention.

FIG. 4 is a sectional view along line B-B' of FIG. 3.

FIG. 5 is a top plan view showing a shape of an upper silicon bench 150 of the transceiver module according to the first exemplary embodiment of the present invention.

FIG. 6 is a sectional view along line C-C' of FIG. 5.

FIG. 7 is a top plan view showing a structure of a transceiver module 200 having a triplex configuration according to a second exemplary embodiment of the present invention.

FIG. 8 is a top plan view showing a shape of a lower silicon bench 220 before each element is fixed in a transceiver module according to the second exemplary embodiment of the present invention.

FIG. 9 is a perspective view showing a sub-mount 236 on which an analogue photodiode 211 or a digital photodiode 212 is to be fixed.

FIG. 10 is a perspective view illustrating a figure of the sub-mount 236 on which the analogue photodiode 211 or the digital photodiode 212 has been attached.

DETAILED DESCRIPTION OF THE EMBODIMENTS

An embodiment of the present invention will hereinafter be described in detail with reference to the accompanying drawings.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Referring to FIG. 1 to FIG. 6, a transceiver module according to the first exemplary embodiment of the present invention will be described in detail.

FIG. 1 is a top plan view showing a structure of a transceiver module 100 according to a first exemplary embodiment of the present invention. FIG. 2 is a sectional view along line A-A' of FIG. 1 showing a side of the transceiver module 100 according to the first exemplary embodiment.

As shown in FIG. 1 and FIG. 2, the transceiver module 100 has a triplex configuration including two optical elements for receiving (i.e., photodiodes) and one optical element for transmitting (i.e., a laser diode). A lower silicon bench 120 on which various elements are fixed and an upper silicon bench 150 are sealed together by a polymer or a solder line 129.

In FIG. 1, the transceiver module 100 includes an analogue photodiode 111, a digital photodiode 112, a laser diode 113, a monitor photodiode 114, a ball lens 115, an optical collimator 116, a first filter 117, and a second filter 118.

The analogue photodiode 111 is a surface incident type, and is coupled to an electrode 111b through wire bonding with the wire 111a. The digital photodiode 112 is a surface incident type, and is coupled to an electrode 112b through wire bonding with the wire 112a.

The monitor photodiode 114 is a diode for controlling the laser diode 113, and the laser diode 113 and the monitor photodiode 114 are coupled to an electrode 114b respectively through wire bonding with the wires 113a and 114a.

The ball lens 115 transforms light generated in the laser diode 113 into parallel light, and transmits it. The first filter 117 is for reflecting an optical signal of a predetermined wavelength to be transmitted to the digital photodiode 112, and the second filter 118 is for reflecting an optical signal of a predetermined wavelength to be transmitted to the analog photodiode 111. The two filters 117 and 118 are fixed in a direction of 45 degrees from the light axis using epoxy. The optical collimator 116 is a cylindrical lens having the same shape as the optical fiber of 125 μm diameter, and is attached in a light-proceeding direction. Light having passed through the ball lens 115 passes through the filters 117 and 118, and is transmitted outside through the optical collimator 116.

Light which is input/output to the transceiver module should pass a free space of which length is about 5-6 mm. The optical collimator 116 minimizes a loss occurring while light is passing the free space, and prevents optical crosstalk between adjacent optical elements.

Meanwhile, when the thickness of the optical collimator is not the same as that of the optical fiber, additional ball lenses or cylindrical lenses are needed, and accordingly the number of elements may be increased. Moreover, when a diameter of a lens that is used because the thickness of the optical collimator is not the same as that of the optical fiber is much thicker than the thickness of the optical fiber, a precise cavity of another size should be provided to an optical bench in order to align the optical axis between the optical fiber and the lens. Therefore, when using the optical collimator in which the cylindrical lens having the same diameter as the optical fiber is attached in the direction the light proceeds, the number of optical parts used in the transceiver module may be reduced, and the additional space for alignment is not necessary so that the production process may become easier.

The analogue photodiode 111, the digital photodiode 112, the laser diode 113, the monitor photodiode 114, the ball lens 115, the optical collimator 116, the first filter 117, and the second filter 118 are fixed on the lower silicon bench 120.

The first and second filters 117 and 118 are formed on a glass panel of which thickness is about 0.5 mm, and are formed through fine sawing so that each surface of the first and second filters 117 and 118 in a rectangular parallelepiped shape may maintain a 90 degree angle. The first and second filters 117 and 118 can be produced in two ways, as shown below. The second filter 118 for the analogue photodiode 111 may be produced to reflect a wavelength band of 1540-1560 nm, and the first filter 117 for the digital photodiode 112 may be produced to reflect a wavelength band of 1480-1500 nm. In another case, the second filter 118 for the analogue photodiode 111 may be produced to reflect a wavelength band of 1300-1500 nm, and the first filter 117 for the digital photodiode 112 may be produced to reflect a wavelength band of 1300-1320 nm.

The digital photodiode 112 for receiving an optical signal of a 1490 nm wavelength and the analogue photodiode 111 for receiving an optical signal of a 1550 nm wavelength are surface light incident type elements. An element is fixed on the silicon bench 120 through the flip-chip process. When both electrodes (two each of electrodes 111b and 112b) of each of the photodiodes 111 and 112 are placed on the same surface with a photosensitive part, the two electrodes of each the photodiodes 111 and 112 are coupled to metal wires on the surface of the silicon bench 120 surface through the flip-chip process. On the other hand, when two each of the electrodes 111b and 112b of the photodiodes 111 and 112 are respectively placed on the front surface and the reverse surface separately, the electrode placed on the photosensitive part side of the photodiode 111 and 112 is coupled to metal wires formed on the silicon bench 120 through the flip-chip process, and the other electrode is coupled to the metal wires through wire bonding with the wires 111a and 112a. The digital photodiode or analogue photodiode 111 and 112 of which diameter of detecting area is over about 80 μm may be selected in order to increase alignment tolerance.

The laser diode 113 generating an optical signal of 1310 nm wavelength should be fixed on a precise place of the silicon bench 120. Therefore, it is fixed through the flip-chip process within the tolerance 1 μm. The ball lens 115 is fixed by using epoxy so that light emitted by the laser diode 113 may be transmitted to the optical collimator 116 as much as possible. The monitor photodiode 114 is fixed to be inclined at 15 degrees in order to detect action of the laser diode 113, and is coupled to an electrode 114b for driving by wire bonding with the wire 114a.

As shown in FIG. 2, the upper silicon bench 150 is joined to the lower silicon bench 120 on which the elements fixed. FIG. 2 is a sectional view along line A-A' of FIG. 1. It illustrates the lower silicon bench 120 on which the optical collimator 116, the first filter 117, the second filter 118, and the ball lens 115 are fixed. The upper silicon bench 150 is formed to include a free space 151 for protecting the elements fixed on the lower silicon bench 120. The transceiver module 100 is assembled by sealing the lower silicon bench 120 and the upper silicon bench 150 together with the polymer or the solder line 129 placed at the periphery of each bench.

Referring to FIG. 3 to FIG. 6, the lower silicon bench 120 and the upper silicon bench 150 of the transceiver module 100 according to the first exemplary embodiment of the present invention will be described in more detail.

FIG. 3 is a top plan view showing a shape of a lower silicon bench 120 before each element is fixed in the transceiver module according to the first exemplary embodiment of the present invention. FIG. 4 is a sectional view along line B-B' of FIG. 3.

As shown in FIG. 3 and FIG. 4, the lower silicon bench 120 includes a first inclined surface 121 for allowing an input optical signal to be provided to the analogue photodiode 111, a second inclined surface 122 for allowing an input optical signal to be provided to the digital photodiode 112, a space 124 for allowing light having passed through the ball lens 115 to proceed smoothly, a space 125 for passively aligning the ball lens 115, a V-shaped groove 126 for passively aligning the optical collimator 116, a space 127 for passively aligning the first and second filters 117 and 118, and a free space 128 as a path for light.

Additionally, the lower silicon bench 120 includes a flip-chip pad 111c for fixing the analogue photodiode 111, an electrode 111b for driving the analogue photodiode 111, a flip-chip pad 112c for fixing the digital photodiode 112, an electrode 112b for driving the analogue photodiode 112, a flip-chip pad 113c for fixing the laser diode 113, a flip-chip pad 114c for fixing the monitor photodiode 114, and an electrode 114b for driving the laser diode 113 and the monitor photodiode 114.

The V-shaped groove 126 in which the optical collimator 116 for inputting/outputting light is formed by a wet etching process, and the free space 128 in which the input/output light can pass freely and the space 127 for fixing the first and second filters 117 and 118 are formed by a dry etching process and are formed in the rectangular parallelepiped shape to vertically align the filters. The inclined surfaces 121 and 122, through which the light reflected by the filters 117 and 118 passes, are formed by the wet etching process. The space 125 for fixing the ball lens 115 is formed on the lower silicon bench 120. The laser diode 113 and the monitor diode 114 for controlling the laser diode 113 are fixed on the flip-chip pads 113c and 114c through the flip-chip process, and the analogue photodiode 111 and the digital photodiode 112 are fixed on the flip-chip pads 111c and 112c. A pillared stand-off is formed on the lower silicon bench 120 in order to fix the laser diode 113 and the monitor photo diode 114 at a predetermined height on the lower silicon bench 120. The upper silicon bench 150 is for protecting various optical elements fixed on the lower silicon bench 120 from exterior surroundings. In order to seal the upper and lower silicon bench 150 and 120, the polymer or solder line 129 is formed on the periphery of the lower silicon bench 120.

FIG. 5 is a top plan view showing the shape of the upper silicon bench 150 of the transceiver module according to the first exemplary embodiment of the present invention. FIG. 6 is a sectional view along line C-C' of FIG. 5.

As shown in FIG. 5 and FIG. 6, a polymer or solder line 159 is formed at the periphery of the upper silicon bench 150 for protecting various optical elements fixed on the lower silicon bench 120 from exterior surroundings. Additionally, on the upper silicon bench 150, the V-shaped groove 156 for fixing and sealing the optical collimator 116 at an accurate location and the free space 151 are formed to protect various optical elements and filters arranged on the lower silicon bench 120 safely when sealing the silicon benches.

In the first exemplary embodiment of the present invention, it has been described that by using the wet etching process, the V shaped groove 126 for the optical collimator 116, the free space 128 for free proceeding of light, and the space 125 of a pyramid shape for fixing the ball lens 115 are formed on the lower silicon bench 120. It has also been described that the space 127 for fixing the filters 117 and 118 are formed by using deep RIE (reactive ion etching) which is one of the dry etching processes. Since the wet and dry etching processes and a metal pattern forming process are used in producing the silicon benches, the production processes should be designed such that no interference occurs among the processes.

Meanwhile, an optical bench can be produced with an injection or stamping scheme using an epoxy molding compound (EMC) by using a metal mold produced with reference to a tested silicon bench in which the elements are precisely aligned. This optical bench should be designed and produced to have a light path of a minimum distance in order to accomplish maximum light union efficiency within a distance in which light output by the optical collimator is maintained to be parallel. To produce this optical bench, a precise mold considering manufacturing tolerance needs to be designed and produced.

As described above, according to the first exemplary embodiment of the present invention, the transceiver module of a triplex configuration can be easily produced by using the passive alignment scheme in fixing the elements on the silicon bench or the optical bench. Additionally, using the optical collimator having the lens of the equivalent diameter to that of optical fiber at the optical input/output end can reduce the number of optical parts. Also, when the number of optical parts is reduced, the production of the optical bench becomes easier, and the production cost can be reduced.

Consequently, due to the use of the passive alignment scheme, the transceiver module can be packaged with a minimum of parts and a low manufacturing cost, and mass production of the transceiver module may become very advantageous.

Next, referring to FIG. 7 to FIG. 10, a transceiver module according to a second exemplary embodiment of the present invention will be described in detail.

FIG. 7 is a top plan view showing a structure of a transceiver module 200 having a triplex configuration according to a second exemplary embodiment of the present invention.

In a transceiver module 200 of the triplex configuration according to the second exemplary embodiment of the present invention, a surface incident type of analogue photodiode 211 and digital photodiode 212 are not directly fixed on the silicon bench 220. Contrary to the first exemplary embodiment of the present invention, the analogue photodiode 211 and the digital photodiode 212 are firstly attached to respective sub-mounts 236, and then the sub-mounts 236 are fixed on the silicon bench 220. Hereinafter, the same parts as in the first exemplary embodiment of the present invention will be denoted by the same numerals, and a detailed description for them will be omitted.

As shown in FIG. 7, the transceiver module 200 includes the analogue photodiode 211, the digital photodiode 212, the laser diode 113, the monitor photodiode 114, the ball lens 115, the optical collimator 116, the first filter 117, and the second filter 118. The arrangements and connections of the laser diode 113, the monitor photodiode 114, the ball lens 115, the optical collimator 116, the first filter 117, and the second filter 118 are the same as in the first exemplary embodiment.

The analogue photodiode 211 is fixed to a side of a sub-mount 236 through a die-bonding process, and is coupled to an electrode 211b through wire bonding with the wires 211d and 211a. The digital photodiode 212 is fixed to a side of another sub-mount 236, and is coupled to an electrode 212b through wire bonding with the wires 212d and 212a.

FIG. 8 is a top plan view showing a shape of the lower silicon bench 220 before each element is fixed in a transceiver module according to the second exemplary embodiment of the present invention.

As shown in FIG. 8, the silicon bench 220 includes a pad 211c on which a sub-mount 236 is fixed, a pad 212c on which a sub-mount 236 is fixed, the space 125 for passively aligning the ball lens 115, the V-shaped groove 126 on which the optical collimator 116 is fixed, the space 127 for passively aligning the filters 117 and 118, and a free space 228 which is a light path. The analogue photodiode 211 and the digital photodiode 212 are fixed on respective sub-mounts 236. The free space 228 is wider than that of the first exemplary embodiment. So, the space 125 for passively aligning the ball lens 115 is provided in the free space 228. The silicon bench 220 includes an electrode 211b for driving the analogue photodiode 211, and an electrode 212b for driving the digital photodiode 212.

FIG. 9 is a perspective view showing a sub-mount 236 on which the analogue photodiode 211 or the digital photodiode 212 is to be fixed. FIG. 10 is a perspective view illustrating a sub-mount 236 on which the analogue photodiode 211 or the digital photodiode 212 has been attached.

In order to fix the sub-mounts 236 on which the analogue photodiode 211 and the digital photodiode 212 are respectively fixed at an accurate location, an alignment mark of a predetermined shape is formed on the silicon bench 220 and the bottom faces of the sub-mounts 236. In addition, on the sub-mounts 236, a pad 237 for fixing the photodiodes by die-bonding and metal wires 238 coupled to electrodes formed on the reverse face of the fixed photodiodes are provided. Also in the second exemplary embodiment, similarly to the first exemplary embodiment, in order to increase alignment tolerance the diameter of the detecting area of the digital photodiode 212 and the analogue photodiode 211 may be selected to be over about 80 μm.

As shown in FIG. 10, the analogue photodiode 211 or the digital photodiode 212 are fixed on the pad 237 by die-bonding, and the analogue photodiode 211 or the digital photodiode 212 and the metal wires 238 are coupled to each other through wire bonding with the wire 211d or 212d.

The sub-mount 236, on which the analogue photodiode 211 or the digital photodiode 212 are fixed as described above, is fixed on the silicon bench 220. In more detail, the sub-mount 236 on which the analogue photodiode 211 is fixed is aligned on the silicon bench 220, and the metal wires 238 of the sub-mount 236 and the electrodes 211b of the silicon bench 220 are coupled to each other through wire bonding with the wires 211a. The sub-mount 236 on which the digital photodiode 212 is fixed is aligned on the silicon bench 220, and the metal wires 238 of the sub-mount 236 and the electrodes 212b of the silicon bench 220 are coupled to each other through wire bonding with the wires 211a.

As described above, according to the second exemplary embodiment of the present invention, the transceiver module of the triplex configuration can be produced more easily by using the sub-mount in fixing the photodiode and fixing the sub-mount on the silicon bench.

According to embodiments of the present invention, the transceiver module of the triplex configuration can be produced easily by using a passive alignment scheme in fixing the elements on the silicon bench or the optical bench. By using the optical collimator having the lens of the equivalent diameter to that of optical fiber at the optical input/output end, the number of optical parts can be minimized. Consequently, due to the use of the passive alignment scheme, the transceiver module can be packaged with minimum parts and manufacturing cost, and mass production of the transceiver module may become very advantageous.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus comprising:
 a transceiver module, the transceiver module including:
  a laser diode for generating an optical signal to transmit;
  a first photodiode for controlling the laser diode;
  a second photodiode for receiving an optical signal of a first wavelength among input optical signals;
  a third photodiode for receiving an optical signal of a second wavelength different from the first wavelength among the input optical signals;
  a first filter for transmitting an optical signal of a first wavelength band to which the first wavelength belongs to the second photodiode; and
  a second filter for transmitting an optical signal of a second wavelength band to which the second wavelength belongs to the third photodiode; and
  an optical collimator, coupled at a light input and output end at an opening at one end of the transceiver module, on which a lens having a same diameter as an optical fiber is coupled in a direction light proceeds to prevent optical crosstalk between adjacent optical signals,
  wherein the optical collimator is passively aligned with the optical fiber, and
  each surface of the first and second filters is formed in a rectangular, parallelpiped shape to maintain a ninety degree angle therebetween.

2. The apparatus of claim 1, wherein the first wavelength band has a range of 1540 to 1560 nm, and the second wavelength band has a range of 1480 to 1500 nm.

3. The apparatus of claim 1, wherein the first wavelength band has a range of 1300 to 1500 nm, and the second wavelength band has a range of 1300 to 1320 nm.

4. The apparatus of claim 1, wherein the first filter and the second filter are respectively arranged to form a 45 degree angle with respect to a light axis.

5. An apparatus comprising:
 a transceiver module, the transceiver module including:
  a laser diode for generating an optical signal to transmit;
  a first photodiode for controlling the laser diode;
  a ball lens for converting an optical signal generated by the laser diode into a parallel optical signal;
  a second photodiode for receiving an optical signal of a first wavelength among input optical signals;
  a third photodiode for receiving an optical signal of a second wavelength different from the first wavelength among the input optical signals;
  a first filter for transmitting an optical signal of a first wavelength band to which the first wavelength belongs to the second photodiode;
  a second filter for transmitting an optical signal of a second wavelength band to which the second wavelength belongs to the third photodiode;
  a cylindrical optical collimator having substantially the same diameter as that of an optical fiber is coupled at a light input and output end located at an end opening of the transceiver module and having a diameter size of an optical fiber;
  a first bench on which the laser diode, the first to third photodiodes, and the first and second filters are aligned and fixed; and
  a second bench for providing a space for protecting the laser diode, the first to third photodiodes, and the first and second filters,
  wherein the second bench is coupled to the first bench and a portion of the first bench and a portion of the second bench in contact together are sealed, each surface of the first and second filters is formed in a rectangular, parallelpiped shape to maintain a ninety degree angle therebetween and an optical element of the collimator is passively aligned with the optical fiber.

6. The apparatus of claim 5, wherein the laser diode and the first to third photodiodes are passively aligned on the first bench by a flip-chip bonding scheme.

7. The apparatus of claim 5, wherein the first bench comprises:
 a first slope for allowing the optical signal of the first wavelength band to be provided to the second photodiode;
 a second slope for allowing the optical signal of the second wavelength band to be provided to the third photodiode;
 a first space in which the ball lens is to be aligned;
 a second space which is a light path;
 a third space provided in the second space, the third space being where the first and second filters are to be aligned; and
 a first groove in which the optical element is to be aligned.

8. The apparatus of claim 7, wherein the first bench further comprises a fourth space for allowing light having passed through the ball lens to proceed smoothly.

9. The apparatus of claim 5, wherein a polymer or solder line for sealing is formed at corresponding edges of the first bench and the second bench.

10. The apparatus of claim 5, wherein the first and second benches are silicon benches formed by using a silicon substrate.

11. The apparatus of claim 5, wherein the first and second benches are optical benches produced by an injection or stamping scheme using a metal mold.

12. The apparatus of claim 5, wherein the optical element provided at the light input/output end is a cylindrical optical collimator having substantially the same diameter as that of an optical fiber.

13. The apparatus of claim 5, wherein the second and third photodiodes are respectively fixed on a sub-mount, and the second and third photodiodes are passively aligned on the first bench.

14. The apparatus of claim 13, wherein the sub-mount comprises:
- a pad for respectively fixing the second and the third photodiodes; and
- a metal wire for being respectively coupled with electrodes of the fixed second and third photodiodes.

15. An apparatus comprising:
an optical bench, the optical bench including:
- a first space in which a ball lens for converting an optical signal to be transmitted into a parallel optical signal is to be aligned;
- a first slope for allowing an optical signal of a first wavelength band in received optical signals to be provided to a first photodiode;
- a second slope for allowing an optical signal of a second wavelength band in the received optical signals to be provided to a second photodiode;
- a second space which is a light path;
- a third space for aligning a first filter that filters the optical signals of the first wavelength band and transmits the optical signals of the first wavelength band to the first photodiode, and a second filter that filters the optical signals of the second wavelength band and transmits the optical signals of the second wavelength band to the second photodiode, wherein the third space is provided in the second space; and
- a first groove in which an optical collimator for light input/output is to be passively aligned with an optical fiber having a same size diameter as the optical collimator,
  wherein a transceiver module is formed on the optical bench and the optical collimator is coupled to the first groove at an opening at one end of the optical bench to prevent optical crosstalk between adjacent optical signals,
  each surface of the first and second filters is formed in a rectangular, parallelpiped shape to maintain a ninety degree angle therebetween.

16. The apparatus of claim 15, wherein the optical bench is a silicon bench formed on a silicon substrate by using an etching process.

17. The apparatus of claim 15, wherein the optical bench is produced by an injection or a stamping scheme using a metal mold.

18. The apparatus of claim 15, wherein the third space is formed to allow the filters to stand up in a vertical direction.

19. The apparatus of claim 15, wherein the first groove is formed in a V shape.

20. The apparatus of claim 15, wherein the first space is formed in a pyramid shape.

21. The apparatus of claim 1, wherein the lens of the optical collimator has substantially the same diameter as that of an optical fiber.

* * * * *